US012785277B2

(12) United States Patent
Hara et al.

(10) Patent No.: US 12,785,277 B2
(45) Date of Patent: Nov. 3, 2026

(54) PATCH ANTENNA

(71) Applicant: YOKOWO CO., LTD., Tokyo (JP)

(72) Inventors: Bunpei Hara, Tomioka (JP); Kenji Hayakawa, Tomioka (JP); Ryosuke Fujii, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 0 days.

(21) Appl. No.: 18/028,793

(22) PCT Filed: Sep. 27, 2021

(86) PCT No.: PCT/JP2021/035401
§ 371 (c)(1),
(2) Date: Mar. 28, 2023

(87) PCT Pub. No.: WO2022/065489
PCT Pub. Date: Mar. 31, 2022

(65) Prior Publication Data
US 2023/0291107 A1 Sep. 14, 2023

(30) Foreign Application Priority Data
Sep. 28, 2020 (JP) ................................ 2020-162325

(51) Int. Cl.
*H01Q 15/00* (2006.01)
*H01Q 1/12* (2006.01)
*H01Q 9/04* (2006.01)

(52) U.S. Cl.
CPC ......... *H01Q 9/0407* (2013.01); *H01Q 1/1271* (2013.01); *H01Q 15/00* (2013.01)

(58) Field of Classification Search
None
See application file for complete search history.

(56) References Cited

U.S. PATENT DOCUMENTS 6,346,919 B1 2/2002 Wang et al.
2020/0295444 A1 9/2020 Sampo
(Continued)

FOREIGN PATENT DOCUMENTS

CN 1713449 A * 12/2005 ........... H01Q 1/1271
CN 101308957 A * 11/2008
(Continued)

OTHER PUBLICATIONS

Abbas et al, UWB Antenna with Parasitic Patch and Asymmetric Feed, 2013, Natural Sciences Publishing, Information Science Letters Journal, p. 27-33 (Year: 2013).*
(Continued)

*Primary Examiner* — Dameon E Levi
*Assistant Examiner* — Anh Ho
(74) *Attorney, Agent, or Firm* — XSENSUS LLP

(57) ABSTRACT

A patch antenna comprising: a planar radiating element; a parasitic element provided at a position spaced apart from an end portion of the radiating element in a plan view when the radiating element is viewed from a direction perpendicular to a surface of the radiating element; and a cable electrically connected to the radiating element and configured to supply power to the radiating element, wherein an axis of the cable passing through a position where the cable is electrically connected to the radiating element is spaced apart from a center of the parasitic element.

12 Claims, 12 Drawing Sheets

(56) References Cited

U.S. PATENT DOCUMENTS

| | | | | |
|---|---|---|---|---|
| 2021/0091480 | A1 | 3/2021 | Sampo | |
| 2022/0352629 | A1* | 11/2022 | Sone | H01Q 1/48 |

FOREIGN PATENT DOCUMENTS

| | | | | | |
|---|---|---|---|---|---|
| CN | 104103897 | A | * | 10/2014 | |
| CN | 103490151 | B | * | 8/2015 | |
| CN | 106299661 | A | * | 1/2017 | |
| JP | 2006254418 | A | * | 9/2006 | |
| JP | 2008141300 | A | * | 6/2008 | |
| JP | 2019-075644 | A | | 5/2019 | |
| WO | WO-2019163521 | A1 | * | 8/2019 | H01Q 1/3258 |

OTHER PUBLICATIONS

International Search Report and Written Opinion mailed on Dec. 7, 2021, received for PCT Application PCT/JP2021/035401, filed on Sep. 27, 2021, 8 pages including English Translation.

* cited by examiner

PATCH ANTENNA

CROSS-REFERENCE TO RELATED APPLICATIONS

The present application is based on PCT filing PCT/JP2021/035401, filed Sep. 27, 2021, which claims priority to Japanese Patent Application No. 2020-162325, filed Sep. 28, 2020, the entire contents of each are incorporated herein by reference.

TECHNICAL FIELD

The present invention relates to a patch antenna.

BACKGROUND ART

As a vehicle-to-everything (V2X) antenna, there is known a technique of a patch antenna in which long linear parasitic elements are disposed along sides in the outside of two opposing sides of a radiating element (see, for example, Patent Literature 1 and Patent Literature 2).

CITATION LIST

Patent Literature

Patent Literature 1: PCT International Publication No. WO 2019/163521

Patent Literature 2: Japanese Unexamined Patent Application Publication No. 2019-75644

SUMMARY OF INVENTION

Technical Problem

For example, in a case where a patch antenna is attached to a windshield or a rear window in a posture in which a front surface (a radiation direction: a direction perpendicular to a surface of a radiating element) of the patch antenna faces a front side or a rear side of a vehicle, a method of routing a power supply cable on a back surface side of the patch antenna is considered. However, in order to route the cable of the antenna attached to the windshield or the rear window in the inside of a vehicle body interior, if the cable extends from the back surface side of the antenna, it is difficult to route the cable.

In a case of a patch antenna including a parasitic element, the cable routing may affect antenna characteristics.

An example of an object of the present invention is to implement cable routing that has a small influence on antenna characteristics in a patch antenna having a parasitic element.

Solution to Problem

An aspect of the present invention is a patch antenna including a planar radiating element, a parasitic element provided at a position spaced apart from the radiating element in a plan view when the radiating element is viewed from a direction perpendicular to a surface of the radiating element, and a cable electrically connected to the radiating element and configured to supply power to the radiating element, in which when a direction along the cable passing through a position where the cable is electrically connected to the radiating element is defined as a cable connection direction, a virtual line in the cable connection direction is positioned away from a center of the parasitic element.

That is, an aspect of the present invention is a patch antenna including a planar radiating element, a parasitic element provided at a position spaced apart from an end portion of the radiating element in a plan view when the radiating element is viewed from a direction perpendicular to a surface of the radiating element, and a cable electrically connected to the radiating element and configured to supply power to the radiating element, in which an axis of the cable passing through a position where the cable is electrically connected to the radiating element is spaced apart from a center of the parasitic element.

According to this aspect, it is possible to implement the cable routing that has a small influence on antenna characteristics.

DESCRIPTION OF EMBODIMENTS

Figure 1:
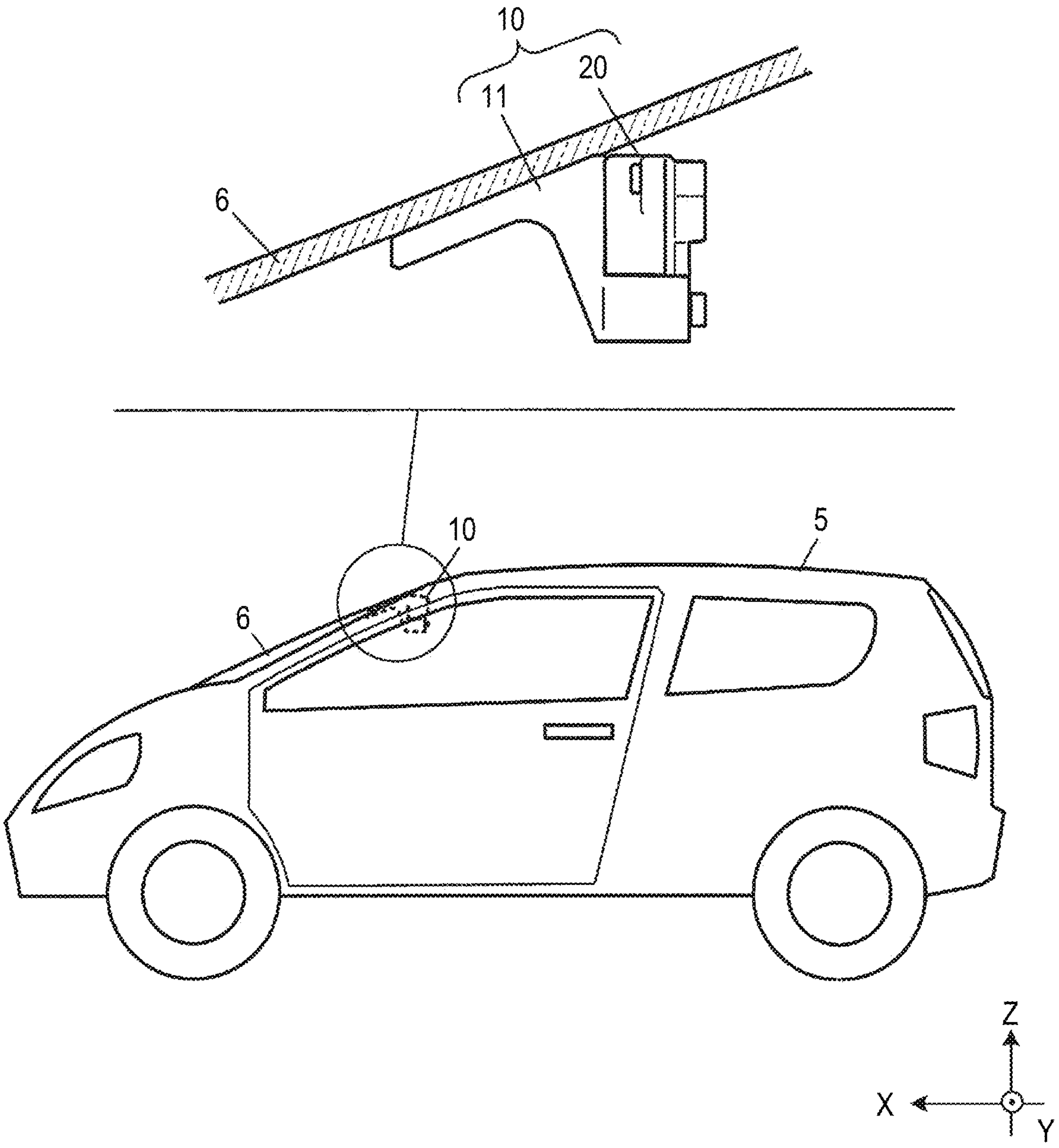
FIG. 1 is a diagram showing an attachment state of an antenna device for a vehicle.

An example of a preferred embodiment of the present invention will be described, but embodiments to which the present invention can be applied are not limited to the following embodiment. Three orthogonal axes indicating common directions are shown in the drawings. The three orthogonal axes are right-handed system in which an X-axis positive direction is a front surface of a patch antenna (a radiation direction: a normal direction perpendicular to a surface of a radiating element). Hereinafter, as directions, the X-axis positive direction is referred to as the front, an X-axis negative direction is referred to as the rear, a Z-axis positive direction is referred to as the upper, a Z-axis negative direction is referred to as the lower, a Y-axis positive direction is referred to as the left, and a Y-axis negative direction is referred to as the right as appropriate. These directions match directions for a driver of a vehicle 5.

Figure 2:
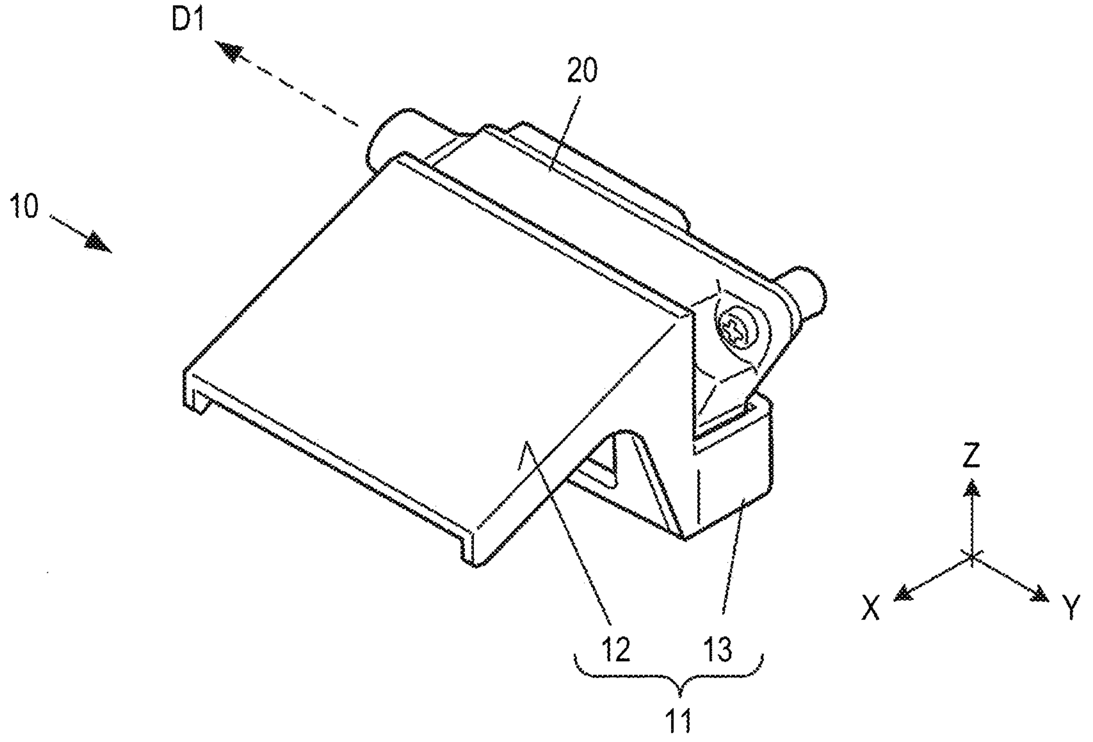
FIG. 2 is a perspective external view of the antenna device for a vehicle as viewed obliquely from a front left upper side.
Figure 3:
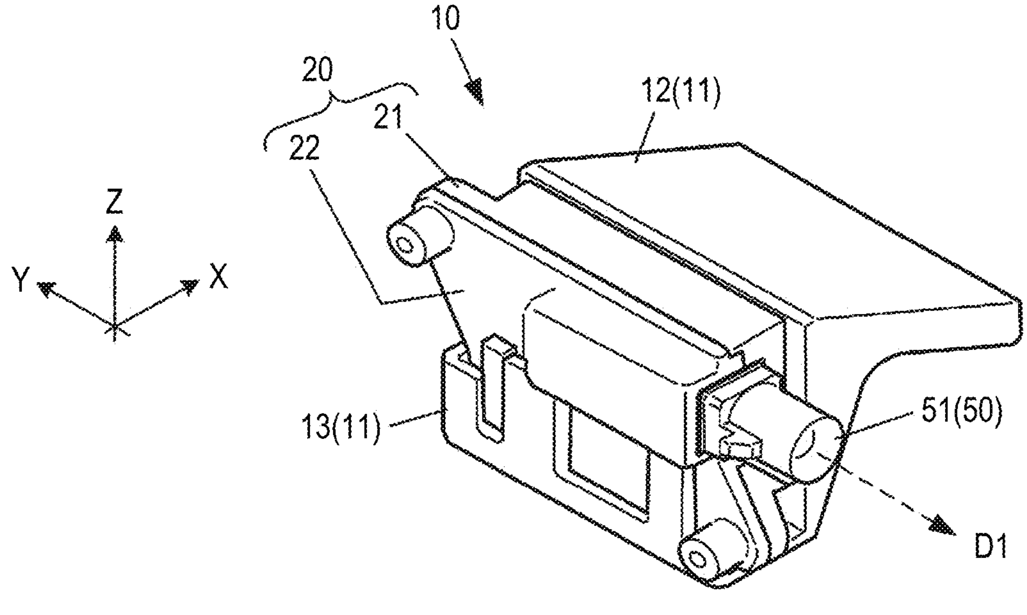
FIG. 3 is a perspective external view of the antenna device for a vehicle as viewed obliquely from a rear right upper side.
Figure 4:
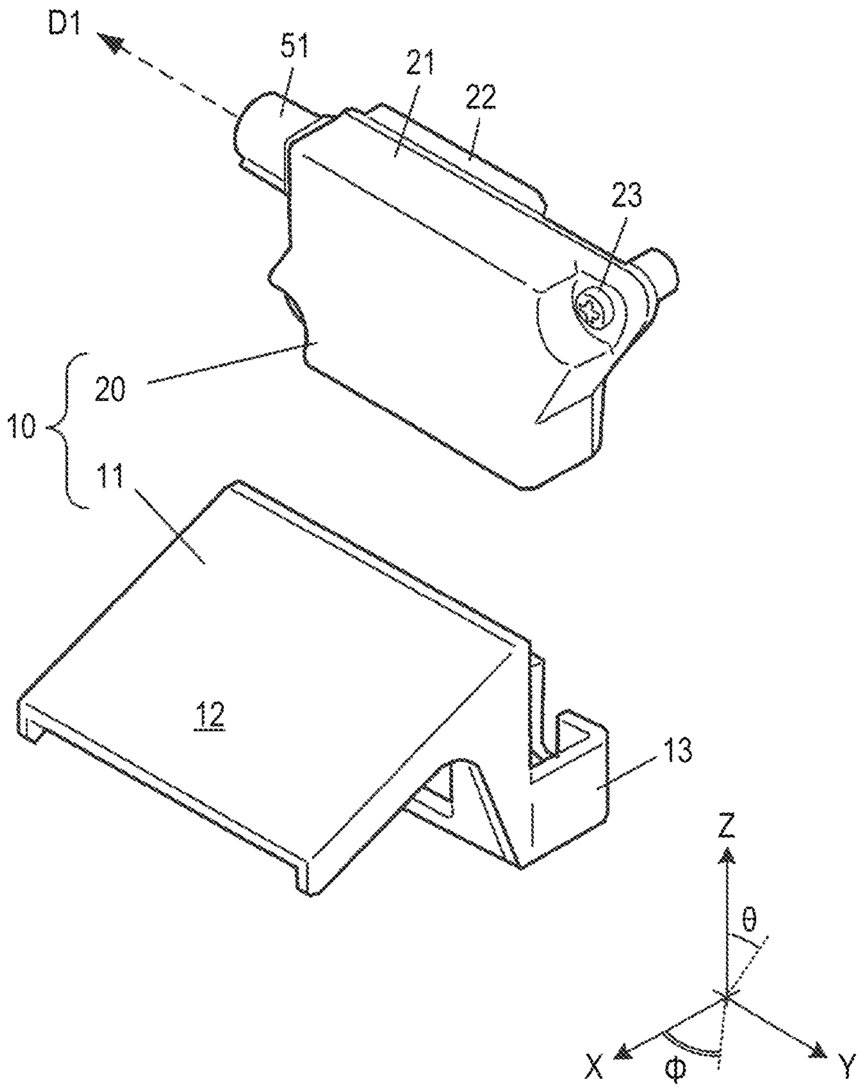
FIG. 4 is an exploded view of the antenna device for a vehicle.

FIG. 1 is a diagram showing an attachment state of an antenna device 10 for a vehicle (an antenna device 10) of the present embodiment, and the upper part is an enlarged view of the attachment state of the antenna device 10. FIG. 2 is a perspective external view of the antenna device 10 as viewed obliquely from a front left upper side. FIG. 3 is a perspective external view of the antenna device 10 as viewed obliquely from the rear right upper side. FIG. 4 is an exploded view of the antenna device 10.

The antenna device 10 includes a bracket 11 and a patch antenna 20. The bracket 11 is attached to a windshield 6 of the vehicle 5. The patch antenna 20 is fixed to the bracket 11 in a posture in which a front surface faces a front side of the vehicle 5. The antenna device 10 may be attached to a rear window of the vehicle 5.

The bracket 11 includes an inclined surface 12 and a holding portion 13. The inclined surface 12 is a surface to be attached to the windshield 6. The holding portion 13 holds the patch antenna 20. A plurality of types of brackets 11 having different angles of the inclined surface 12 are prepared in advance. The bracket 11 of a type suitable for an inclination angle of the windshield 6 of the vehicle 5 to which the antenna device 10 is attached is selected and used.

The holding portion 13 is a saucer-shaped portion extending downward from an upper end portion of the inclined surface 12. The patch antenna 20 is inserted into and fixed to the holding portion 13 from above.

Figure 5:
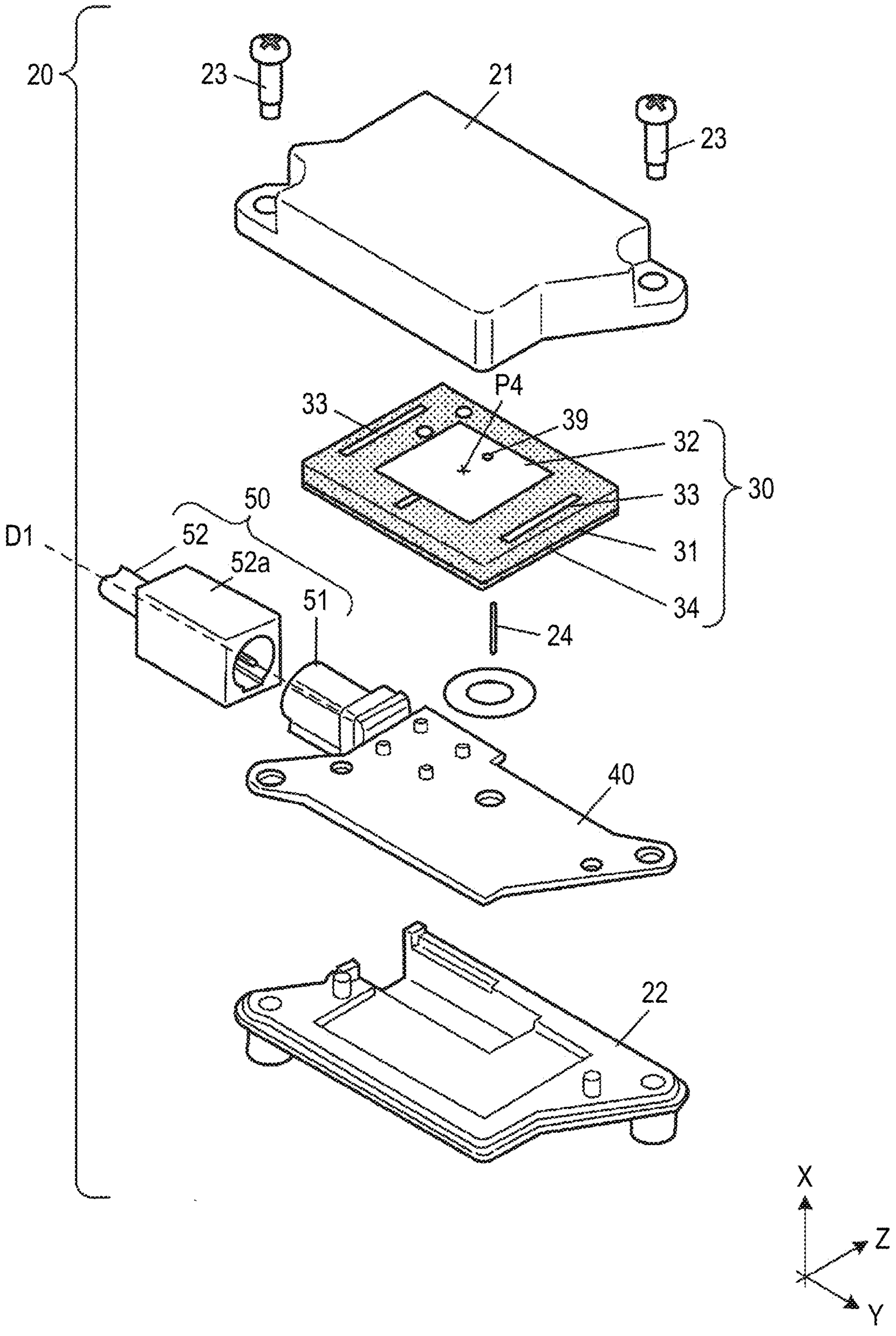
FIG. 5 is an exploded view of a patch antenna.

FIG. 5 is an exploded view of the patch antenna 20. The patch antenna 20 includes, in an internal space, an antenna body 30, a substrate (PCB: printed-circuit hoard) 40, and a routing structure 50 for a power supply cable. The internal space is defined by bringing a case 21 and a base 22 into contact with each other and coupling and fixing the case 21 and the base 22 with screws 23.

Figure 6:
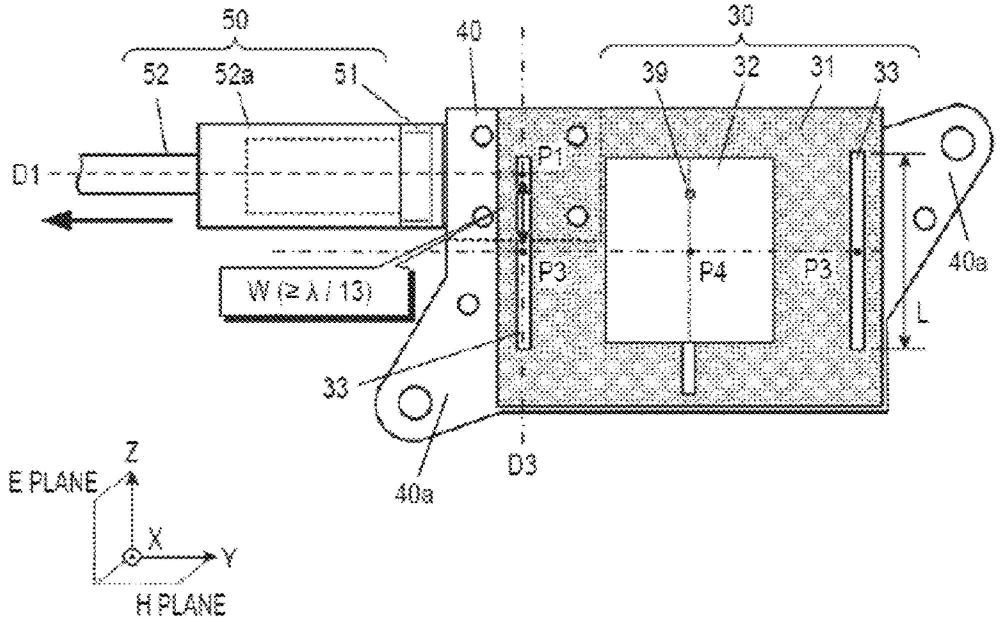
FIG. 6 is a front view of the patch antenna showing a relative positional relation between an antenna body and a routing structure.

The antenna body 30 is fixed to the case 21 and the base 22 by fastening the substrate 40 to the case 21 and the base 22 with the screws 23 at a pair of regions 40*a* of the substrate 40. As shown in FIG. 6, the pair of regions 40*a* extend outward from diagonally opposite positions of the dielectric 31, such that the connection terminal 51 and one of the regions 40*a* are disposed opposite to each other with the dielectric 31 therebetween. Further, in a plan view, the connection terminal 51 and at least one of the pair of regions 40*a* are offset from a line connecting a center of the substrate 40 and a center of the parasitic element 33. As a result, for example, it is possible to prevent abnormal noises caused by vibration or the like during traveling. A cable 52 is connected to a connection terminal 51 provided on the substrate 40. In general, a "prying force" may be generated via the cable 52 when the antenna device 10 is installed in the vehicle 5. However, with such a configuration, the "prying force" is transmitted to the case 21 and the base 22 via the connection terminal 51 and the screws 23. Therefore, it is possible to prevent the "prying force" from acting on the antenna body 30 and to prevent the influence of the "prying force" on a circuit of the antenna body 30 and a joint portion of solder or the like.

The antenna body 30 includes a planar radiating element 32, a pair of parasitic elements 33, and a ground conductor 34. The radiating element 32 is disposed on a surface side (a front surface side: an X-axis positive direction side) of a dielectric 31. The ground conductor 34 is positioned on a back surface side (a rear surface side: an X-axis negative direction side) of the dielectric 31. In the present embodiment, the dielectric 31 is a dielectric substrate, but the dielectric 31 may be a member made of ceramic or a member made of resin.

The radiating element 32 is electrically connected to a pin 24 penetrating the dielectric 31 and the ground conductor 34 at a feeding point 39, and is electrically connected to the routing structure 50 for a power supply cable via the substrate 40 to which an end portion of the pin 24 is connected.

The parasitic element 33 is a linear conductor having a rectangular (quadrilateral) shape in a plan view when the radiating element 32 is viewed from an X-axis positive direction side in a direction (the normal direction) perpendicular to a surface of the radiating element 32. The parasitic element 33 is provided at a position spaced apart from the radiating element 32 in a plan view. It can also be said that the parasitic element 33 is provided at a position spaced apart from an end portion of the radiating element 32 in a plan view. Specifically, one parasitic element 33 is provided on each of a Y-axis positive side and a Y-axis negative side with a longitudinal direction of the parasitic element 33 as a direction along a line connecting a center P4 of the radiating element 32 (a geometric center of the radiating element 32) and the feeding point 39 of the radiating element 32 in a plan view.

Figure 7:
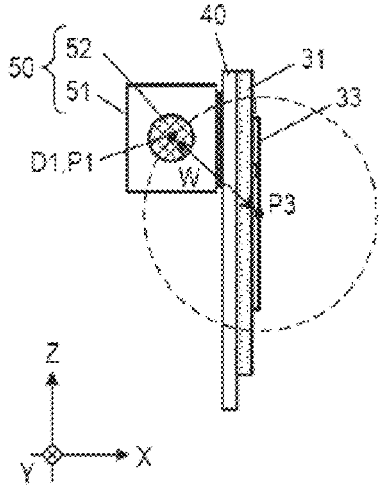
FIG. 7 is a side view of the patch antenna showing the relative positional relation between the antenna body and the routing structure.

FIG. 6 is a front view of the patch antenna 20 showing a relative positional relation between the antenna body 30 and the routing structure 50. FIG. 7 is a side view of the patch antenna 20 showing the relative positional relation between the antenna body 30 and the routing structure 50.

As shown in FIG. 6, the routing structure 50 is a structure in which the cable 52 that is electrically connected to the radiating element 32 and supplies power to the radiating element 32 is routed from the side of the antenna body 30 where the parasitic element 33 is positioned. The routing structure 50 includes the connection terminal 51 that is a connection destination of a connection terminal 52*a* provided at a distal end of the cable 52 such as a coaxial cable. The cable 52 is electrically connected to the radiating element 32 via the connection terminal 51 connected to the substrate 40. FIG. 6 shows a state in which the cable 52 is connected. The routing structure 50 may further include, in addition to the connection terminal 51, the connection terminal 52*a* on the cable 52 side connected to the connection terminal 51 and the cable 52. When the cable 52 is directly connected to the connection terminal 51 without providing the connection terminal 52*a*, the routing structure 50 may include the cable 52. The configuration in which the cable 52 is connected via the connection terminal 51 or the connection terminal 52*a* facilitates an attachment operation. A shape of the connection terminal 51 may be an I-shape or an L-shape. Even if a standard of the cable 52 is different depending on a type of the vehicle 5, a specification can be changed flexibly and easily by changing a type of the connection terminal 51.

A configuration in which the cable 52 is directly connected to a back surface (a surface on the X-axis negative direction side) of the substrate 40 may be adopted, and the connection terminal 51 may be omitted.

Preferred conditions relating to the routing structure 50 will be described.

In FIG. 6, a direction indicated by an arrow indicates a cable connection direction. The cable connection direction is an extension direction of the cable 52 extending from the connection terminal 51, in other words, a direction along the cable 52 passing through a position where the cable 52 is electrically connected to the radiating element 32. A reference numeral D1 shown in FIGS. 6 and 7 denotes a virtual line in the cable connection direction, in the present embodiment, for easier understanding, the virtual line D1 is represented as an axis of the cable 52 extending from the connection terminal 51.

When the virtual line D1 is represented as the axis of the cable 52, a central axis portion that linearly extends from a position where the cable 52 is electrically connected to the radiating element 32 is represented as the axis of the cable 52. For example, even in a case where the cable 52 is curved, bent, or meandering, the central axis portion that linearly extends from the position where the cable 52 is electrically connected to the radiating element 32 is represented as the axis of the cable 52.

As shown in FIGS. 6 and 7, a point where the virtual line (the axis of the cable 52) D1 in the cable connection direction and a spherical surface of a virtual sphere centered on a center (a geometric center of the parasitic element 33) P3 of the parasitic element 33 are in contact with each other is defined as a position P1. The position P1 is a position where a distance between the virtual line D1 and the center P3 of the parasitic element 33 is the shortest. Therefore, a distance W between the position P1 and the center P3 of the parasitic element 33 is also the distance W between the virtual line D1 and the center P3 of the parasitic element 33. In the plan view shown in FIG. 6, the position P1 is shown as if it is on the parasitic element 33, but actually, as shown in FIG. 7, the position P1 is on the X-axis negative direction from the parasitic element 33.

The routing structure 50 is a structure in which the virtual line D1 is positioned away from the center P3 of the parasitic element 33. Specifically, in a plan view in which the radiation element 32 is viewed from an X-axis positive side in the direction perpendicular to the surface of the radiating element 32, (1) the virtual line D1 does not pass through the center P3 (a small black circle in FIG. 6) of the parasitic element 33 (that is, the virtual line D1 is positioned away from the center P3 of the parasitic element 33), and (2) the virtual line D1 is substantially parallel to the surface of the radiating element 32. In the routing structure 50, the cable connection direction is set to (3) a direction intersecting the longitudinal direction of the parasitic element 33. In the routing structure 50, (4) in the plan view, the virtual line D1 is disposed on a side where the feeding point 39 of the radiating element 32 is disposed with respect to the center P3 of the parasitic element 33. The parasitic element 33 is disposed between the connection terminal 51 of the routing structure 50 and the radiating element 32 in the plan view.

In the routing structure 50, (5) the distance W between the virtual line D1 and the center P3 of the parasitic element 33 is set to be approximately λ/26 or more, more preferably approximately λ/13 or more, where λ is a frequency for use.

According to the routing structure 50, it is possible to implement cable routing that has a small influence on antenna characteristics. A simulation result regarding the patch antenna 20 having the routing structure 50 will be described.

Figure 8A:
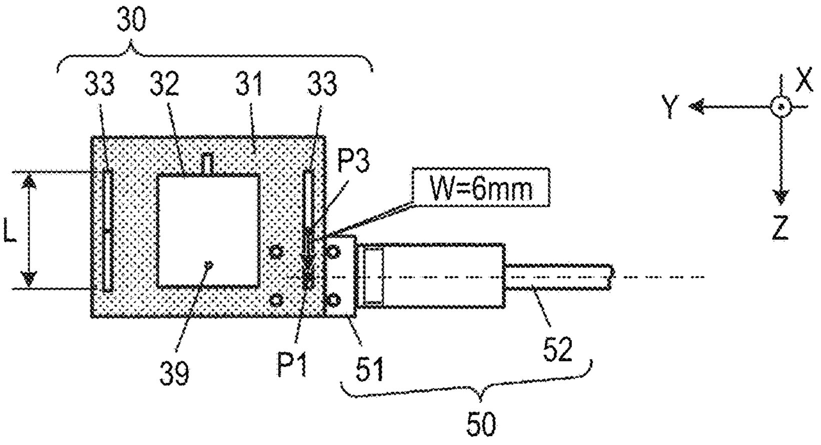
FIG. 8A is a diagram showing a relative positional relation between the antenna body and the routing structure.
Figure 8B:
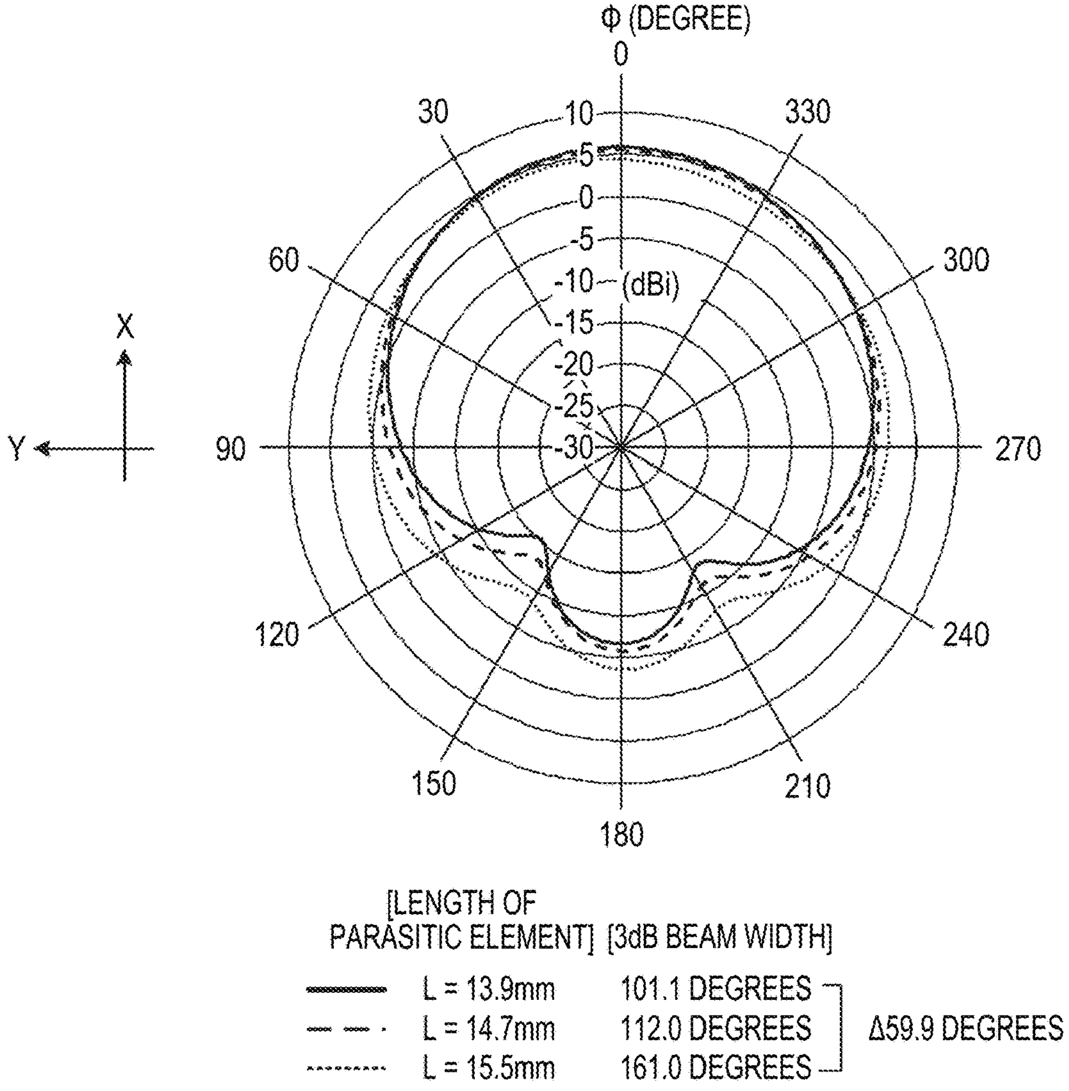
FIG. 8B is a radiation pattern showing a radiation directivity in polar coordinates when a length of a parasitic element is changed in the patch antenna of FIG. 8A.
Figure 9A:
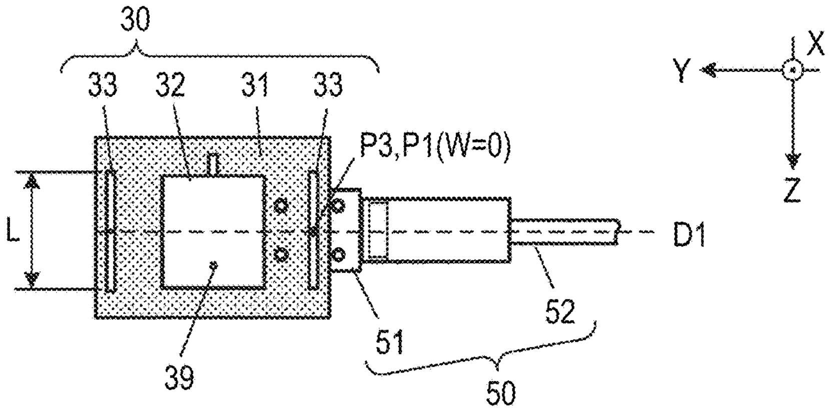
FIG. 9A is a diagram showing a relative positional relation between the antenna body and a routing structure in a comparative example.
Figure 9B:
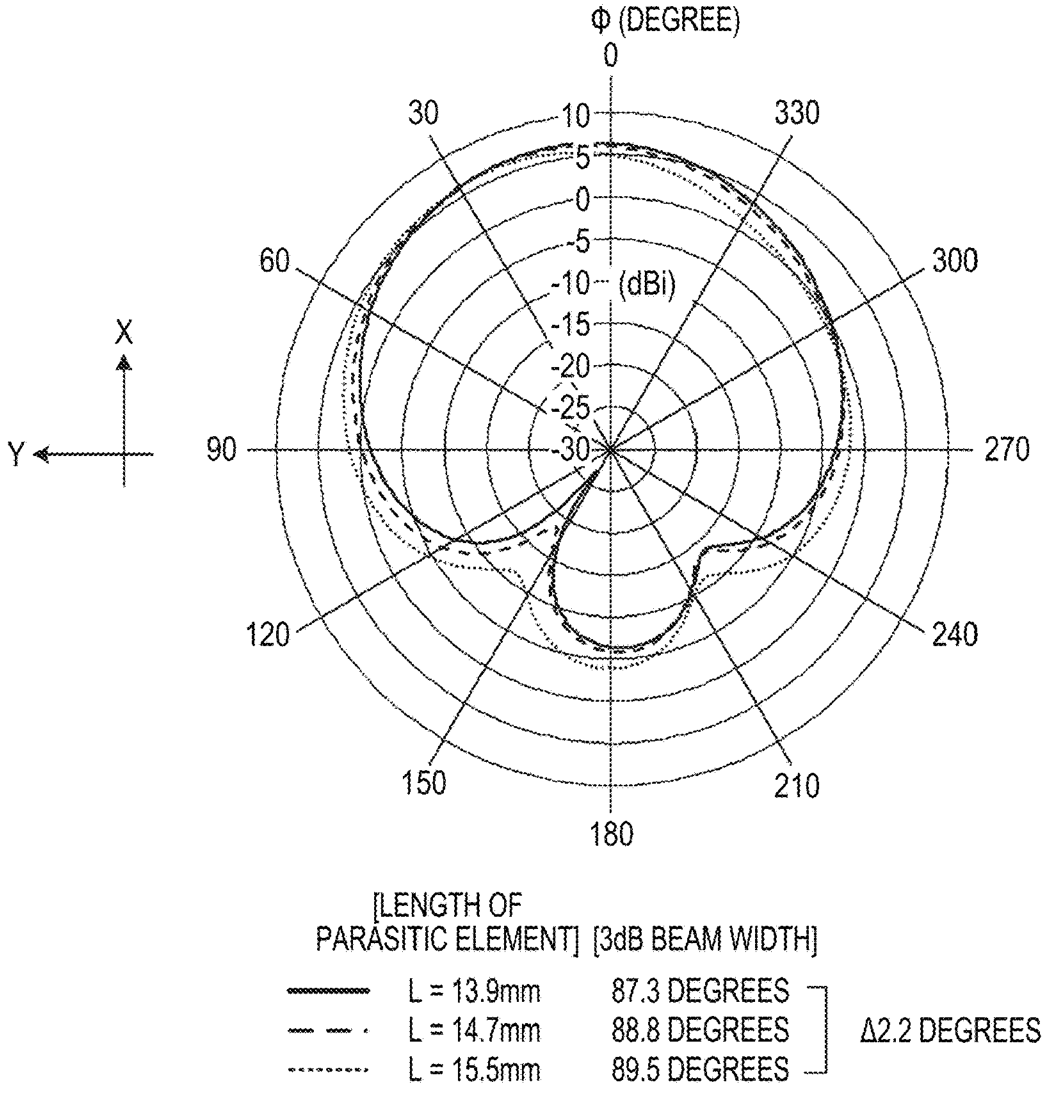
FIG. 9B is a radiation pattern showing a radiation directivity in polar coordinates when a length of a parasitic element is changed in the comparative example of FIG. 9A.

Fitz. 8A shows a relative positional relation between the antenna body 30 and the routing structure 50. FIG. 8B shows a radiation pattern in which a radiation directivity of an H plane (an XY plane) related to the patch antenna 20 in FIG. 8A when a length L of the parasitic element 33 is changed is shown by polar coordinates. The used frequency λ is 5,900 MHz, and the distance W is 6 mm. FIG. 9A shows a relative positional relation between the antenna body 30 and the routing structure 50 of a comparative example created by changing the distance W of the patch antenna 20. FIG. 9B shows a radiation pattern in which a radiation directivity of the H plane according to the patch antenna of the comparative example is shown by polar coordinates when the length L of the parasitic element 33 is changed. In the comparative example, the position P1 is a position where the connection terminal 51 and the like do not interfere with the parasitic element 33, and is a position where a distance from the center P3 of the parasitic element 33 is minimized. When seen in a plan view, since the distance W in the patch antenna is 0 (zero) or substantially 0 (zero), hereinafter, the distance W at this time is referred to as the distance W=0 for convenience. The used frequency λ is 5,900 MHz. In both FIGS. 8B and 9B, in the H plane, φ=0 degrees in the X-axis positive direction (a forward direction) and φ=90 degrees in the Y-axis positive direction (a leftward direction).

In the radiation directivity patterns of FIGS. 8B and 9B, a line type indicates a difference in the length L of the parasitic element 33. The larger a 3 dB beam width (an angular range where a gain difference with respect to a peak gain is 3 dB), the wider the angular range where a decrease from the peak gain is within 3 dB and the wider the directivity.

As shown in FIG. 9B, in the configuration of the comparative example, the 3 dB beam width is in a range of 87.3 degrees to 89.5 degrees. Even if the length L of the parasitic element 33 is changed, a difference between a maximum value and a minimum value of the 3 dB beam width is 2.2 degrees.

On the other hand, as shown in FIG. 8B, in the patch antenna 20 of the present embodiment in which the distance W is 6 mm, all the 3 dB beam widths exceed 100 degrees, Therefore, it can be said that when the virtual line D1 is spaced apart from a straight line passing through the center P3 of the parasitic element 33, the directivity becomes wider and the influence of the cable routing on the antenna characteristics becomes smaller. In other words, when the virtual line D1 passes through a position away from the center P3 of the parasitic element 33 and is in a direction away from the radiating element 32, the directivity is widened.

As shown in FIG. 8B, when the length L of the parasitic element 33 is changed in the patch antenna 20 of the present embodiment, the difference between the maximum value and the minimum value of the 3 dB beam width is 59.9 degrees. Therefore, it can be said that the directivity can be further widened by further increasing the length L of the parasitic element 33. Conversely, it can be said that the directivity can be narrowed by further reducing the length L of the parasitic element 33. According to the patch antenna 20 of the present embodiment, the influence of the cable routing on the antenna characteristics can be reduced, and the directivity can be adjusted by the length L of the parasitic element 33.

Figure 10A:
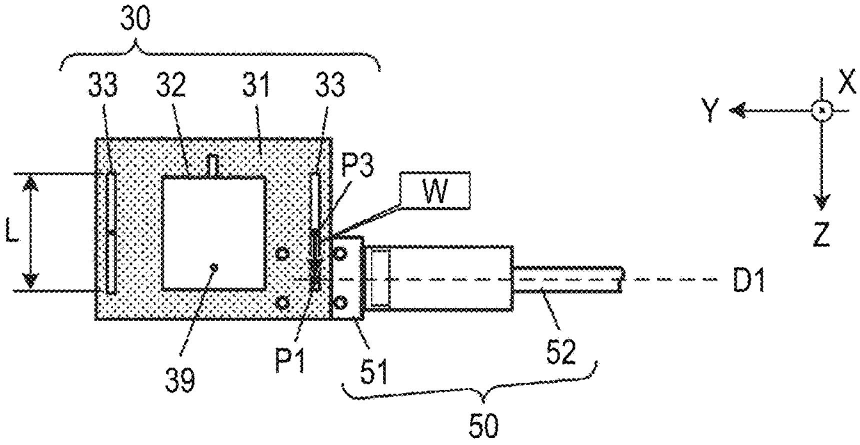
FIG. 10A is a diagram showing a relative positional relation between the antenna body and the routing structure.
Figure 10B:
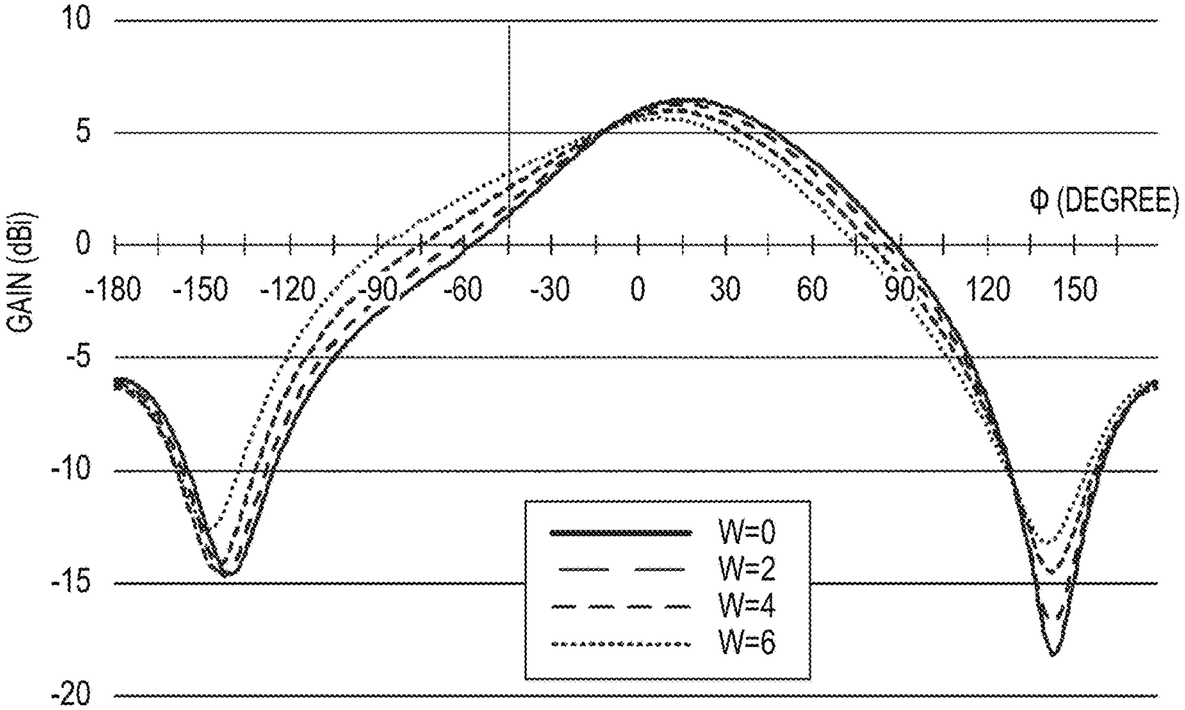
FIG. 10B is a radiation pattern showing a radiation directivity in orthogonal coordinates when a distance W is changed in FIG. 10A.

FIG. 10A shows a relative positional relation between the antenna body 30 and the routing structure 50. FIG. 10B shows a radiation pattern in which a radiation directivity on the H plane is shown in orthogonal coordinates when the length L of the parasitic element 33 is fixed, the virtual line D1 is shifted to a Z-axis positive side (a side closer to the feeding point 39), and the distance W in the relative positional relation of FIG. 10A is changed.

Figure 11A:
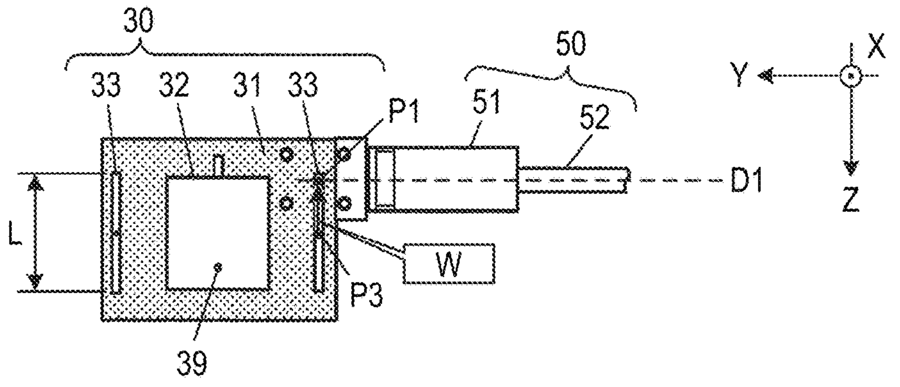
FIG. 11A is a diagram showing a relative positional relation between the antenna body and the routing structure.
Figure 11B:
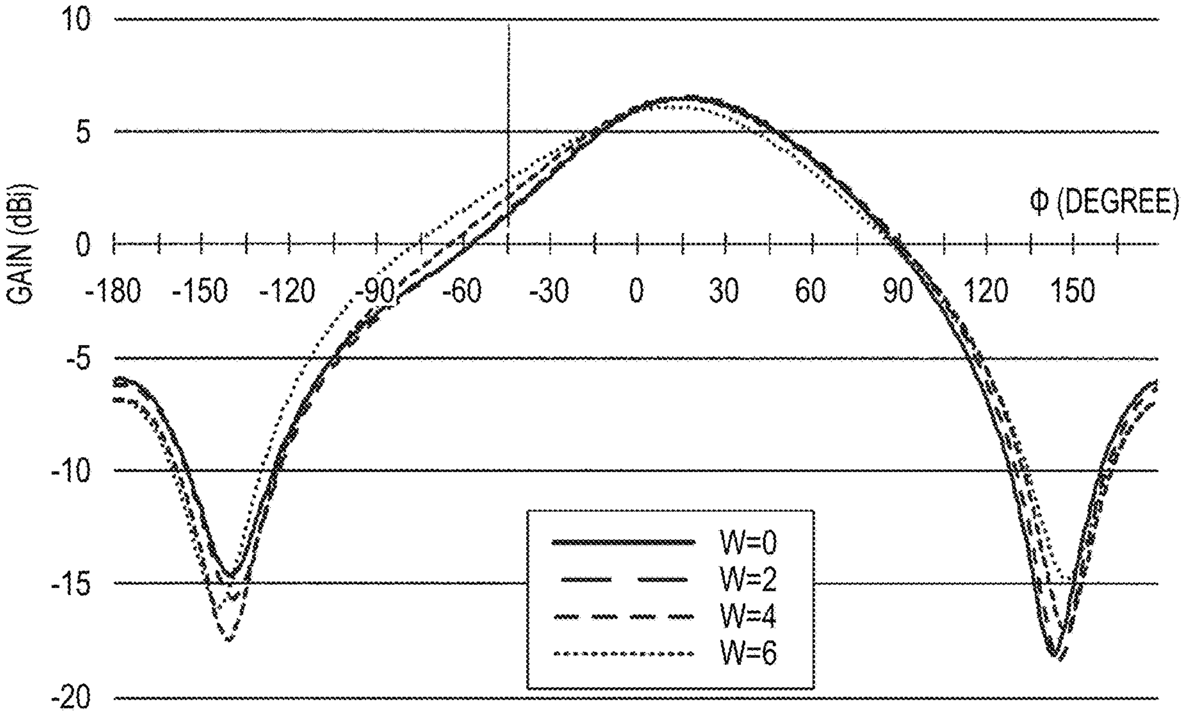
FIG. 11B is a radiation pattern showing a radiation directivity in orthogonal coordinates when the distance W is changed in FIG. 11A.

FIG. 11A shows a relative positional relation between the antenna body 30 and the routing structure 50. FIG. 11B shows a radiation pattern in which a radiation directivity on the H plane is shown in orthogonal coordinates when the length 1, of the parasitic element 33 is fixed, the virtual line D1 is shifted to a Z-axis negative side (a side away from the feeding point 39), and the distance W in the relative positional relation of FIG. 11A is changed.

Figure 12:
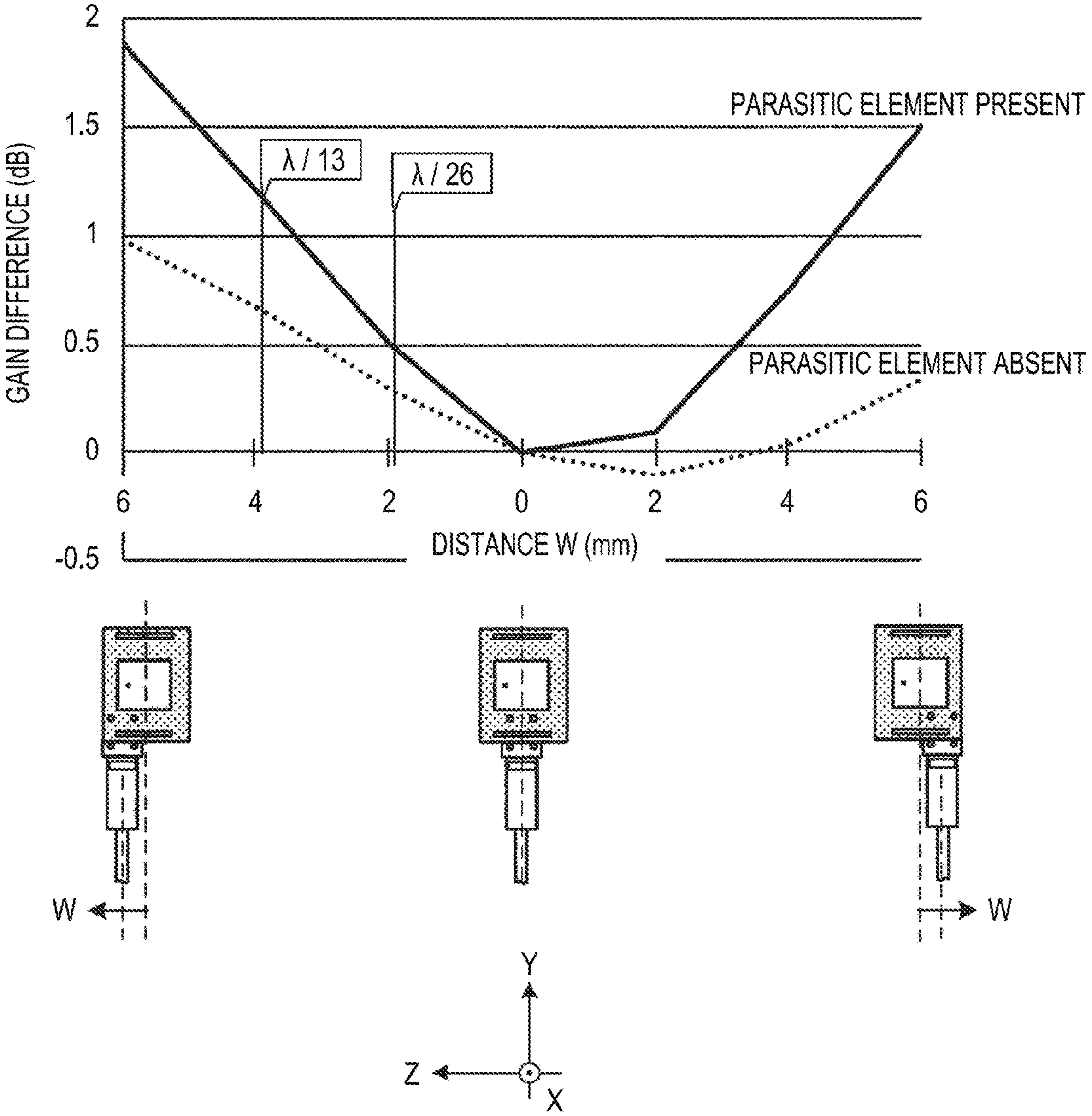
FIG. 12 is a graph showing a gain difference at each distance W with respect to a reference gain at the distance W=0.

In FIG. 12, the upper part shows a graph showing a gain difference at each distance W with respect to a reference gain when the distance W is set to 0 (zero), focusing on a gain at the angle φ=minus 45 degrees, and the lower part shows relative positional relations between the antenna body 30 and the routing structure 50 corresponding to the distances W. In the graph, a solid line indicates a case where the parasitic element 33 is "present", and a broken line indicates a case where the parasitic element 33 is "absent".

In FIGS. 10B, 11B, and 12, in the H plane, φ=0 degrees in the X-axis positive direction (the forward direction) and φ=90 degrees in the Y-axis positive direction (the leftward direction).

Comparing the graphs of FIGS. 10B, 11B, and 12, it can be seen that a relatively high gain is obtained when the virtual line D1 is set from the center P3 of the parasitic element 33 to a side where the feeding point 39 is positioned even at the same distance W. For example, in FIG. 12, in a case where the distance W is 6 mm, the gain increases by about 1.9 dB when the virtual line D1 is on the Z-axis positive side. In contrast, when the virtual line D1 is on the Z-axis positive side, the gain increases by about 1.5 dB. Therefore, it is preferable to separate the virtual line D1 to the side where the feeding point 39 is positioned than to separate the virtual line D1 to a side where the feeding point 39 is not positioned.

When the distance W is expected to increase the gain by 0.5 dB or more compared to when the distance W is 0 (zero) at φ of minus 45 degrees, it can be determined that a significant effect is obtained. Therefore, according to FIG. 12, it is preferable that the distance W is approximately 1.8 mm or more, which is approximately λ/26 or more.

In φ of minus 45 degrees, it is more preferable to set a distance W at which a gain increase of about 1 dB or more is obtained compared to when the distance W is set to 0 (zero). Therefore, according to FIG. 12, it is more preferable that the distance W is approximately 3.7 mm or more, which is approximately λ/13 or more, at which a gain increase larger than 1 dB can be expected.

Figure 13:
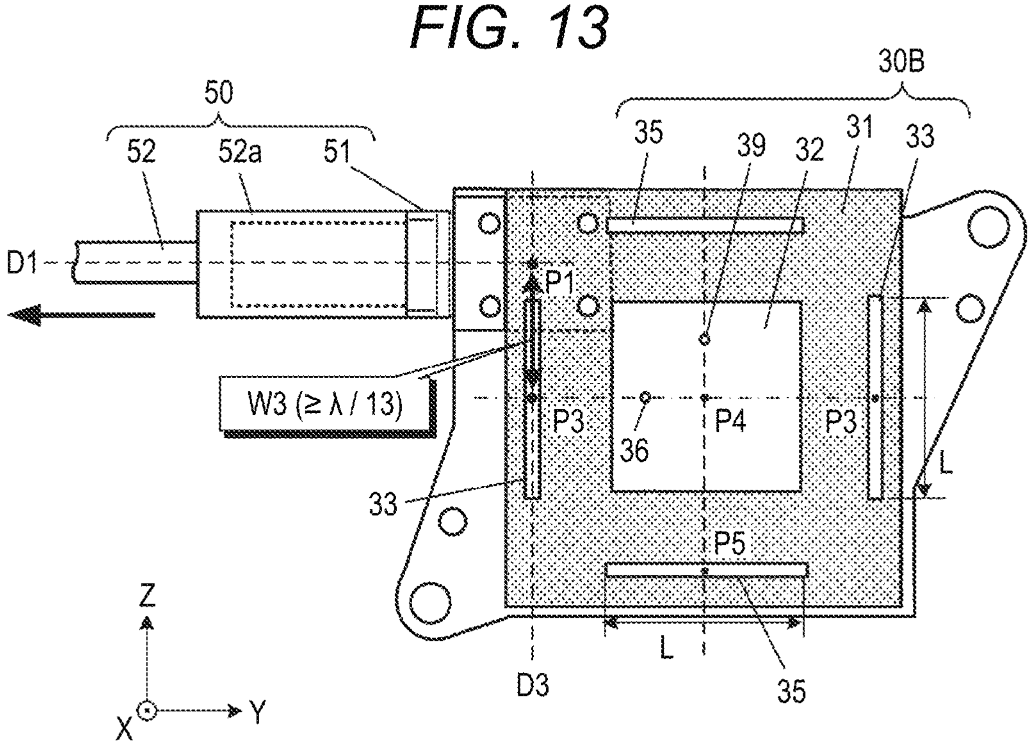
FIG. 13 is a front view showing a relative positional relation between an antenna body and a routing structure according to a first modification.
Figure 14:
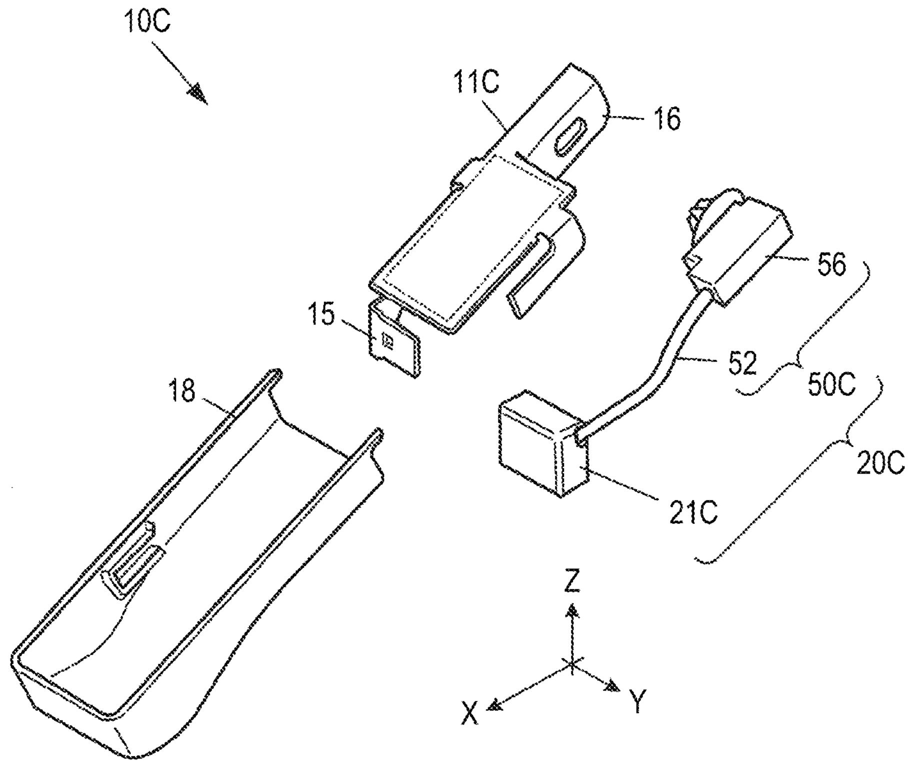
FIG. 14 is an exploded view of an antenna device for a vehicle according to a second modification.
Figure 15:
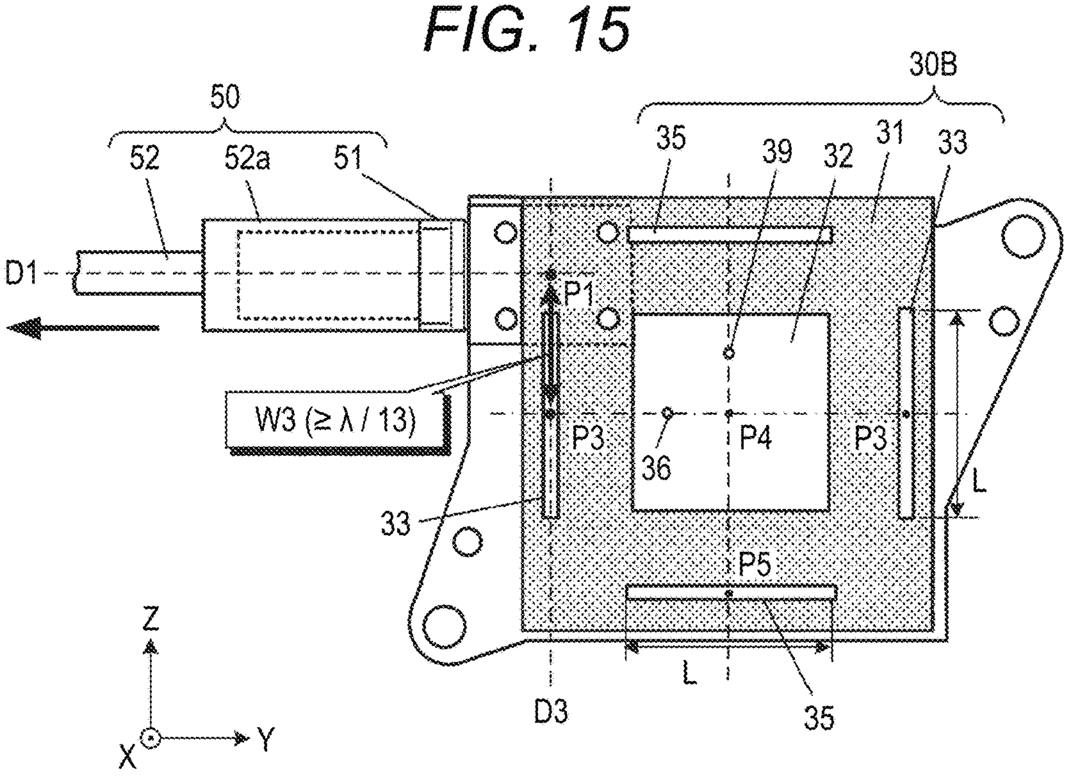
Figure 16:
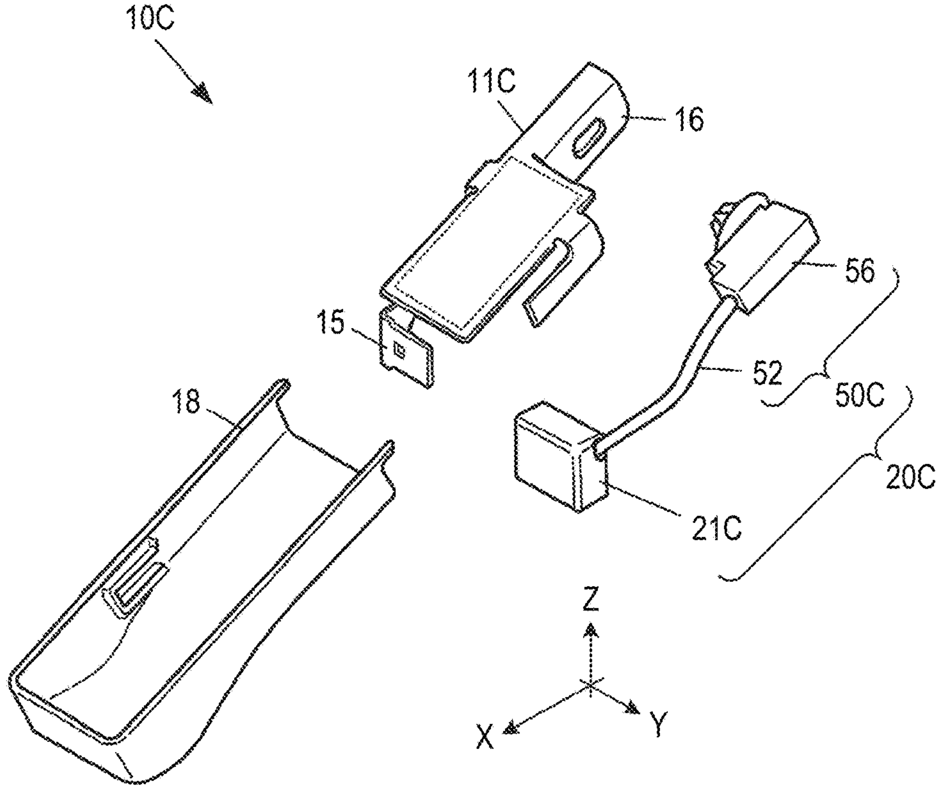

FIGS. 13 and 14 are diagrams showing a simulation result of an intensity distribution of a surface current in a steady state. FIG. 13 is a simulation result of the patch antenna 20 of the present embodiment when the virtual line D1 is separated by a distance W of 6 mm to the feeding point 39 side. FIG. 14 is a simulation result of a patch antenna in which the distance W is set to 0 (zero) as a comparative example.

What should be noted is the intensity of a surface current of the parasitic element 33 on a side closer to the connection terminal 51 and an around the parasitic element 33. The corresponding portion is shown by an ellipse of a broken line in FIGS. 13 and 14. The center P3 of the parasitic element 33 is shown by a White arrow. When the distance W is set to 6 mm, it is indicated that the surface current in the vicinity of the center of the parasitic element 33 is stronger than that of the comparative example, and the function of the parasitic element 33 is more exhibited. This indicates that when the distance W is set to 6 mm as compared with the comparative example, the directivity expandability of the parasitic element 33 acts, that is, the influence of the cable routing on the antenna characteristics can be reduced.

<First Modification>

The patch antenna 20 of the above embodiment may be a two-point feeding type patch antenna such as a circularly polarized patch antenna. For example, as shown in FIG. 13, an antenna body 30B includes parasitic elements 33 and parasitic elements 35 in the outside of four sides of the radiating element 32. The parasitic elements 33 are disposed on a Y-axis positive direction side and a Y-axis negative direction side with respect to the radiating element 32 to form a pair. The parasitic elements 35 are disposed on a Z-axis positive direction side and a negative direction side with respect to the radiating element 32 to form a pair. The radiating element 32 includes the first feeding point 39 and a second feeding point 36.

The virtual line D1 is set along a Y-axis. Therefore, a distance W3 is determined in the same manner as the distance W of the above embodiment with reference to the parasitic element 33 on the Y-axis positive direction side close to the routing structure 50 out of the parasitic elements 33. In this case, a high gain can be obtained by separating the virtual line D1 to the sides where the feeding point 36 and the feeding point 39 are positioned, rather than separating the virtual line D1 to a side where the feeding point 36 or the feeding point 39 is not positioned.

<Second Modification>

The virtual line D1 does not necessarily have to be orthogonal to a virtual line D3 in a longitudinal direction of the parasitic element 33 in a plan view. In the plan view, the virtual line D1 may be in a direction intersecting the virtual line D3, for example, may be set to be inclined with respect to the virtual line D3. When the parasitic element 33 has a rectangular shape, the virtual line D3 represents a line (an axis) that passes through the center (the geometric center) P3 of the parasitic element 33 and connects short sides of the parasitic element 33. In other words, the virtual line D3 represents a line that passes through the center (the geometric center) P3 of the parasitic element 33 and is parallel to long sides of the parasitic element 33.

For example, an antenna device 10C for a vehicle shown in FIG. 14 includes a patch antenna 20C, a bracket 11C to be attached to the windshield 6, and a cover 18. The patch antenna 20C includes a case 21C that accommodates an antenna body, the cable 52, and a connector 56 provided at a distal end of the cable 52. The case 21C is held by a distal end holding portion 15 of the bracket 11C, and the connector 56 is held by a rear end holding portion 16 of the bracket 11C. The cover 18 accommodates the antenna device 10C to cover a surface other than a bonding surface to the windshield 6.

The patch antenna 20C basically has the same configuration as the antenna body 30 of the above embodiment, but a routing structure 50C is different from the routing structure 50 of the antenna body 30. The routing structure 50C includes, instead of the connection terminal 51, the cable 52 having one end fixed to the substrate 40, and the connector 56 provided at the distal end of the cable 52. A fixing position of the cable 52 and the substrate satisfies the same conditions as the conditions related to the routing structure 50 in the antenna body 30.

The virtual line D1 in the routing structure 50C is set to form an angle of 45° with respect to the virtual line D3 in the longitudinal direction of the parasitic element 33 shown in FIG. 6 in a plan view viewed from an X-axis positive direction.

An example of a method of attaching the antenna device 10C is as follows. First, the bracket 11C is attached to the windshield 6. Next, the patch antenna 20C is inserted into and fixed to the distal end holding portion 15 of the bracket 11C from the side, and the connector 56 is pressed into and fixed to the rear end holding portion 16 from the side, Finally, the cover 18 is attached to the bracket 11C along an XZ plane to slide obliquely from a front lower side to a rear upper side along the windshield 6.

By setting the virtual line D1 obliquely with respect to the virtual line D3, a width in a Y-axis direction required for routing the cable 52 can be reduced. When another sensor or camera is attached to the windshield 6, if the width in the Y-axis direction can be reduced, a degree of freedom of an attachment position of the antenna device 10C increases accordingly. Setting the virtual line D1 obliquely with respect to the virtual line D3 means that an angle formed by the virtual line D1 and the virtual line D3 is an angle other than 90 degrees and 180 degrees, and includes, for example, approximately 45 degrees in a YZ plane and approximately 45 degrees in the XZ plane.

According to this attachment method, the opportunity to apply a load for pushing up the windshield 6 from a vehicle interior side can be limited to the time of attaching the bracket 11C. In a manufacturing line of the vehicle 5, an adhesive on the windshield 6 attached to the vehicle 5 may not be sufficiently cured. At this time, when attaching the antenna device 10C to the vehicle 5, the antenna device 10C can be attached without applying a load that excessively pushes up the windshield 6 according to the attachment method described above.

<Summary>

The disclosure of the present specification including the embodiment and the modifications thereof described above can be summarized as follows.

An aspect of the present disclosure is a patch antenna including a planar radiating element, a parasitic element provided at a position spaced apart from the radiating element in a plan view when the radiating element is viewed from a direction perpendicular to a surface of the radiating element, and a cable electrically connected to the radiating element and configured to supply power to the radiating element, in which when a direction along the cable passing through a position where the cable is electrically connected to the radiating element is defined as a cable connection direction, a virtual line in the cable connection direction is positioned away from a center of the parasitic element.

That is, an aspect of the present disclosure is a patch antenna including a planar radiating element, a parasitic element provided at a position spaced apart from an end portion of the radiating element in a plan view when the radiating element is viewed from a direction perpendicular to a surface of the radiating element, and a cable electrically connected to the radiating element and configured to supply power to the radiating element, in which an axis of the cable passing through a position where the cable is electrically connected to the radiating element is spaced apart from a center of the parasitic element.

According to this aspect, it is possible to implement the cable routing that has a small influence on antenna characteristics.

A distance between the virtual line (the axis) and the center of the parasitic element may be approximately λ/26 or more, where λ is a frequency for use.

With such a configuration, it is possible to implement the cable routing that has a small influence on antenna characteristics, and further, it is possible to increase a gain.

A distance between the virtual line (the axis) and the center of the parasitic element may be approximately λ/13 or more, where λ is a frequency for use.

With such a configuration, it is possible to implement the cable routing that has a small influence on antenna characteristics, and further, it is possible to increase the gain.

The parasitic element may have a rectangular shape in the plan view, and the cable connection direction may be a direction intersecting a longitudinal direction of the parasitic element in the plan view.

That is, the parasitic element may have a rectangular shape in the plan view, and the axis may intersect a line parallel to the longitudinal direction of the parasitic element in the plan view.

With such a configuration, a surface current in the vicinity of the center of the parasitic element can be increased. As a result, the function as the parasitic element can be exhibited, and directivity expandability can be acted. Therefore, the influence on antenna characteristics can be reduced.

The longitudinal direction of the parasitic element may be a direction along a line connecting a center of the radiating element and a feeding point of the radiating element in the plan view, and the virtual line (the axis) may be disposed on a side where the feeding point of the radiating element is positioned with respect to the center of the parasitic element in the plan view.

With such a configuration, a high gain can be obtained.

The patch antenna may further include a connection terminal that connects the cable to the radiating element.

With such a configuration, it is possible to prevent a "prying force" from acting on an antenna body, and it is possible to prevent an adverse effect on a circuit or a joint portion of the antenna body. Further, an attachment operation is facilitated. Even if a standard of the cable is different depending on a type of a vehicle, a specification can be changed flexibly and easily by changing a type of the connection terminal.

The parasitic element may be disposed between the connection terminal and the radiating element in the plan view.

The patch antenna may include the cable and a connector connected to a distal end of the cable.

The patch antenna may further include a substrate on which the radiating element and the parasitic element are provided and to which the radiating element and the cable are electrically connected, a base on which the substrate is disposed, and a case forming an accommodation space for accommodating the base, the radiating element, the parasitic element, and in which the substrate, and the case, the substrate, and the base are fastened together.

With such a configuration, for example, it is possible to prevent abnormal noises caused by vibration or the like during traveling.

REFERENCE SIGNS LIST

5 vehicle
6 windshield

10, 10C antenna device
11, 11C bracket
12 inclined surface
13 holding portion
15 distal end holding portion
16 rear end holding portion
18 cover
20, 20C patch antenna.
21, 21C case
22 base
23 screw
24 pin
30, 30B antenna body
31 dielectric
32 radiating element
33 parasitic element
34 ground conductor
35 parasitic element
36 second feeding point
39 first feeding point
40 substrate
44 radiating element
50, 50C routing structure
51 connection terminal
52 cable
52*a* connection terminal
56 connector
D1 virtual Line (axis) in cable connection direction
D3 virtual line in longitudinal direction
P1 position
P3 center of parasitic element
P4 center of radiating element
λ used frequency communication frequency)
φ angle

The invention claimed is:

1. A patch antenna comprising:
- a dielectric having a quadrilateral shape;
- a planar radiating element provided on one surface of the dielectric and having a feeding point;
- a parasitic element provided at a position spaced apart from an end portion of the planar radiating element in a plan view when the planar radiating element is viewed from a direction perpendicular to a surface of the planar radiating element;
- a cable electrically connected to the planar radiating element and configured to supply power to the planar radiating element;
- a substrate disposed at another surface of the dielectric, and electrically connecting the feeding point of the planar radiating element and the cable; and
- a connection terminal connected to an outer peripheral side of the substrate,
- wherein the substrate has a pair of regions extending outward from diagonally opposite positions of the dielectric,
- wherein, in the plan view, the connection terminal and one of the regions are disposed opposite to each other with the dielectric therebetween, and
- wherein, in the plan view, the cable is pulled out from the outer peripheral side of the substrate via the connection terminal.

2. The patch antenna according to claim 1, wherein a distance between an axis of the cable and the center of the parasitic element is approximately λ/26 or more, where λ is a frequency for use.

3. The patch antenna according to claim 1, wherein a distance between an axis of the cable and the center of the parasitic element is approximately λ/13 or more, where λ is a frequency for use.

4. The patch antenna according to claim 1, wherein
- the parasitic element has a rectangular shape having a pair of long edges and a pair of short edges in the plan view, and
- an axis of the cable intersects a line parallel to a direction of the long edges of the parasitic element in the plan view.

5. The patch antenna according to claim 4, wherein
- the direction of the long edges of the parasitic element is a direction along a line connecting a center of the planar radiating element and the feeding point of the planar radiating element in the plan view.

6. The patch antenna according to claim 1, wherein the parasitic element is disposed between the connection terminal and the planar radiating element in the plan view.

7. The patch antenna according to claim 1, further comprising:
- a base on which the substrate is disposed; and
- a case forming an accommodation space for accommodating the base, the planar radiating element, the parasitic element, and the substrate,
- wherein the case, the substrate, and the base are fastened together.

8. The patch antenna according to claim 1, wherein, in the plan view, an axis of the cable shifts from a line connecting a center of the substrate and a center of the parasitic element.

9. The patch antenna according to claim 1, wherein
- in the plan view, the connection terminal and at least one of the pair of regions are offset from a line connecting a center of the substrate and a center of the parasitic element.

10. The patch antenna according to claim 7, wherein the case, the substrate, and the base are fastened together by screws.

11. The patch antenna according to claim 7, wherein the case and the base are fastened to each other through the pair of regions.

12. The patch antenna according to claim 1, wherein each of the pair of regions includes a through-hole configured to receive a screw.

* * * * *